United States Patent [19]
Dixon et al.

[11] 3,899,254
[45] Aug. 12, 1975

[54] CHEMICAL LIGHT METER AND METHOD OF MEASURING LIGHT THEREWITH

[75] Inventors: George D. Dixon, Monroeville; David H. Davies; John D. Voytko, both of Pittsburgh, all of Pa.

[73] Assignee: Westinghouse Electric Corporation, Pittsburgh, Pa.

[22] Filed: July 31, 1973

[21] Appl. No.: 384,323

[52] U.S. Cl. .............................. 356/234; 252/408
[51] Int. Cl.² ............................................ G01J 1/48
[58] Field of Search ............... 252/408; 96/90 PC; 356/234

[56] References Cited
UNITED STATES PATENTS

| | | | |
|---|---|---|---|
| 1,845,835 | 2/1932 | Frankenburger et al. | 252/408 X |
| 2,939,959 | 6/1960 | Linschitz | 252/408 X |
| 3,352,773 | 11/1967 | Schwartz et al. | 260/233.3 R X |
| 3,370,902 | 2/1968 | Allinikov | 96/90 PC X |

Primary Examiner—Ronald L. Wibert
Assistant Examiner—F. L. Evans
Attorney, Agent, or Firm—R. D. Fuerle

[57] ABSTRACT

A solution is formed of a polymer which degrades in the presence of light and a photograding compound which degrades the polymer when exposed to light. A non-photo-reducible dye may be included in the solution to filter out unwanted wavelengths. When the solution is exposed to light, the polymer is degraded and the viscosity of the solution is lowered. The solution is conveniently packaged in a sealed tube with a bubble of a non-interfering gas, and the viscosity of the solution is determined by timing the rise of the bubble. The amount of light striking the meter may be determined by comparing the time required for the gas bubble to rise in the tube with the time required for a bubble to rise in identically filled tubes exposed to various known quantities of light.

24 Claims, 1 Drawing Figure

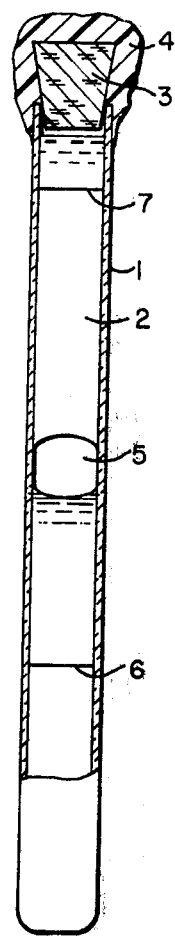

CHEMICAL LIGHT METER AND METHOD OF MEASURING LIGHT THEREWITH

BACKGROUND OF THE INVENTION

There are three general types of instruments for measuring light: radiometric devices, where light is converted into heat, photoelectric devices, where the light generates a current, and chemical devices, where the light causes a chemical change. The major advantage of chemical light meters is their simplicity, which reduces both their cost and the likelihood of errors. While chemical light meters have been developed for much of the spectrum, most of the acceptable liquid meters are only sensitive to light having wavelengths of 2,000 to 5,000A (i.e., ultraviolet and blue-green). See the article in Ecology, Vol. 39, No. 1, pages 151 to 152 by W. G. Dore, titled "A Simple Chemical Light-Meter" (1958); Station Paper No. 165, U.S. Forest Service, Dept. of Agriculture by D. A. Marquis et al titled, "A Chemical Light Meter for Forest Research" (1962); and the book "Analytical Photochemistry and Photochemical Analysis," chapter 3, by Hugh A. Taylor (1971).

DESCRIPTION OF THE PRIOR ART

See the article in Vol. 41, No. 6 (June, 1949) of Industrial and Engineering Chemistry by Evan F. Evans and Lane F. McBurney, titled "Ultraviolet Light Stability of Ethylcellulose;" U.S. Pat. No. 3,352,773, which discloses dispersions of cellulose and sodium nitrite in water which are dryed and exposed to light to degrade the cellulose; an article titled "Effect of Ultraviolet Light on Cellulose Acetate and Nitrate," by T. S. Lawton and H. K. Nason, Industrial and Engineering Chemistry, Vol. 36, No. 12, pages 1128-1130, (Dec. 1944); an article titled "On the Mechanism of Photo - and Photo - oxidative - Degradation of Acetyl Cellulose," by O. P. Kozmina et al., European Polymer Journal — Supplement, pages 447-452 (1967); and an article titled "Photoreduction of Metal Ions by Visible Light," by Gisela K. Oster et al., presented at the 135th meeting of the American Chemical Society (1959).

SUMMARY OF THE INVENTION

We have found that a solution of a polymer which degrades in the presence of light, a photodegrading compound and an optional non-photoreducible dye is an effective chemical light meter. The degree of degradation depends on the amount of light striking the solution and can be determined by measuring its viscosity.

The advantages of our chemical light meter over other chemical light meters are that it can be made nonflammable and non-toxic, it can be made sensitive to almost any wavelength of light (i.e., about 3,500 to about 7,800A), and it can be made very sensitive or very insensitive so that it can accumulate light from as little as about a day to as long as about a year. Also, the preferred compositions resist microbiological attack, which would produce an erroneous viscosity reading, and they are stable at temperatures of up to 90°C. The light meter is very inexpensive and can be read in the field with no special equipment by a person having no special skills.

DESCRIPTION OF THE INVENTION

The accompanying drawing illustrates a certain presently preferred embodiment of this invention.

In the drawing a tube 1, similar to a Gardener-Holdt viscosity tube, contains a solution 2 of a photodegrading compound and a polymer which degrades in the presence of light. The tube is most conveniently made of glass or plastic, and is usually clear, but it may be colored to block out wavelengths one is not interested in measuring. A cork 3 stops the open end of the tube and is sealed with silicone sealant although other methods of sealing the tube can also be used such as a screw cap. Inside the tube is a bubble 5 which is large enough to touch the entire perimeter (i.e., all sides) of the tube when the tube is vertical and the bubble is not at the top or the bottom of the tube. The bubble, which is shown rising in the middle of the tube, is most conveniently an air bubble but may be an non-interfering gas which is insoluble in the solvent. The tube is marked with lines 6 and 7 for timing the bubble as it traverses the length of the tube. Line 6 is above the bubble when the bubble is at the bottom of the tube and line 7 is usually below the bubble when the bubble is at the top of the tube. The distance between the lines should be at least about one-half inch and preferably at least about 2 inches since, although a bubble movement of as little as about one-half inch could be timed, a more precise measurement requires at least about a 2 inch movement.

THE POLYMER

The polymer in the solution may be any organic polymer which degrades in the presence of light since a solution of any polymer which does so degrade will decrease in viscosity. The polymer should have a molecular weight of at least about 50,000 and preferably of at least about 500,000 in order to produce a large difference in viscosity between solutions of the undegraded and degraded polymers. The polymer concentration is preferably at least about 0.1% since lesser concentrations produce solutions of very low viscosity, and the concentration is preferably less than about 10% as greater concentrations produce solutions which are too viscous. (All percentages herein for compounds in solution are by weight based on the entire solution weight unless otherwise indicated.) The preferred concentration range, which gives the most satisfactory viscosities, is about 1 to about 2%. The polymer must be in solution to obtain a true viscosity reading. Dispersions will not produce significantly high viscosities at reasonable solid levels.

Examples of suitable polymers include polyvinyl chlorides, polystyrenes, polyethers, and polyenes such as polyethylene, polypropylene, and polyvisobutylene. Polyethers are preferred as they are easy to degrade and they use an aqueous solvent while polyenes, polystyrenes, and polyvinyl chlorides require non-aqueous solvents. Examples of suitable polyethers include methyl vinyl ether/maleic anhydride copolymers, carbohydrates, cellulose ethers, and polyalkylene oxides such as polyethylene oxide and polyethylene oxide copolymers. Cellulose ethers are preferred as they produce easily degraded aqueous solutions.

The cellulose ethers which are preferred have the general formula.

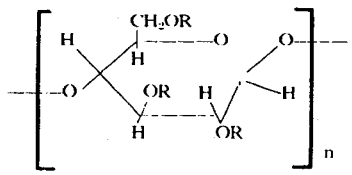

wherein $n$ is an integer from about 300 to about 3000 and R is H, alkyl to $C_4$, hydroxyalkyl to $C_4$, or mixtures thereof. Examples of suitable cellulose ethers include hydroxy propyl methyl cellulose, hydroxy ethyl cellulose, hydroxy propyl cellulose, methyl ethyl cellulose, ethyl isopropyl butyl cellulose, hydroxy methyl ethyl cellulose, etc. The preferred polymer is hydroxyethyl cellulose as its aqueous solution is homogeneous, moderately resistant to bacteria, does not precipitate at higher (e.g., 60°C) temperatures, and can be degraded easily.

THE SOLVENT

The solvent should be a solvent for the polymer, the photodegrading compound, and the non-photoreducible dye, the accelerator, antifreeze, etc., if present. It should, of course, be at least partially transparent at the wavelengths that the light meter is to measure. Water is most commonly used and is preferred because it is inexpensive and non-hazardous, but acetone, alcohol, sulfolane, methyl-ethyl ketone, 2-vinyl pyrollidone, etc. could also be used where necessary to form a solution or to transmit at particular wavelengths.

THE PHOTODEGRADING COMPOUND

A soluble photodegrading compound which degrades the polymer in the presence of light is included in the solution to control the wavelengths to which the light meter is sensitive. The polymer may degrade at one wavelength while the photodegrading compound is activated at another wavelength of greater interest (or it may be activated at the same wavelength). The mechanism by which the degradation occurs is not always clear. The photodegrading compound may directly oxidize the polymer or it may form a reactive species which attacks the polymer. Preferably, the concentration of the photodegrading compound is about 10 ppm to about 2% since less than about 10 ppm is not of much use and more than 2% is usually unnecessary and wasteful.

Examples of photodegrading compounds include nitrites such as sodium nitrite and ammonium nitrite, nitric acid, nitrates such as sodium potassium, and ammonium nitrate, peroxides such as hydrogen peroxide, t-butyl hydroperoxide, and cumene hydroperoxide, dissolved oxygen, copper compounds such as cupric stearate, lead compounds such as tetraethyl lead, hydrochloric acid etc. Sodium nitrite is preferred for sensitivity in the ultraviolet.

The preferred class of photodegrading compounds for sensitivity in the visible spectrum is the photoreducible dyes. The photoreducible dye is reduced by light of a particular wavelength to produce free radicals which oxidize the polymer, degrading it, and therefore reducing its viscosity in solution. The photoreducible dye should preferably have an oxidation potential, when in the photoreduced state, of at least about $-200$ mv in order to effectively degrade the polymer; no dyes are commonly known to exist which have oxidation potentials greater than $-1500$ mv. The amount of photoreducible dye used is preferably sufficient to absorb about 10 to about 90% of the available light at the absorption maximum of the dye, since below about 10% is not of much use and above about 90% is impractical to obtain. The preferred photoreducible dyes are the leuco dyes as they are less temperature-sensitive. Leuco dyes produce peroxide free-radicals by reacting with any available oxygen, for example, from the polymer itself or dissolved in the solvent. The peroxide free-radicals are very effective in degrading polymers, particularly the polyethers.

The preferred class of leuco dyes are the fluorescein derivatives as they are stable, commercially available, and give a good reaction. The preferred fluorescein dye is the disodium salt of 4',5'-dibromo-2',7'-dinitrofluorescein, known as "Eosin B," C.I. No. 45400. (The C.I. number is the identification number of the Society of Dyers and Colorists). Eosin B is preferred of the photoreducible dyes because it is very sensitive to light and produces free-radicals which are powerful polymer degraders. Other suitable fluorescein dyes include fluorescein sodium (C.I. No. 43,550, "uranin"), the disodium salt of 2',4',5',7'-tetrabromofluorescein (C.I. No. 45,380, "Eosin $\gamma$S"), tetraethyl rhodamine (C.I. No. 45,170, "Rhodamine B"), and the sodium salt of 4,5,6,7-tetrachloro-2',4',5',7'-tetraiodo-fluorescein.

Other suitable leuco dyes include acridines such as 3,6-diamino acridinium chloride and hydrochloride ("proflavine dihydrochloride"), 3,6-diamino acridinium monohydrogen sulfate ("proflavine sulfate"), 3,7-bis (dimethylamino) phenathionium chloride (C.I. No. 52,015, "methylene blue"), 7-(dimethylamino)-3-imino-3H-phenothiazine ("Azure A"), 7-(dimethylamino)-3-(methylamino)-3H-phenothiazine hydrochloride (C.I. No. 52,010, "Azure B"), and 3-imino-7-(methylamino),-3H-phenothiazine hydrochloride ("Azure C").

The photograding compound could, of course, be selected to degrade the particular polymer being used. For example, peroxides, nitrites, nitric acid, dissolved oxygen, and photoreducible dyes are used with polyethers, sodium nitrite and photoreducible dyes being preferred; copper compounds, peroxides, lead compounds, photoreducible dyes, and dissolved oxygen are used with polyenes, peroxides, nitrates, photoreducible dyes, and dissolved oxygen are used with polystyrenes; and dissolved oxygen, peroxides, photoreducible dyes, and hydrochloric acid are used with polyvinyls.

THE NON-PHOTOREDUCIBLE DYE

A soluble non-photoreducible dye is preferably included in the composition to enhance its selectivity for the wavelength of interest. The non-photoreducible dye acts as an internal filter and absorbs wavelengths that one is not interested in measuring, but is at least partially transparent at the wavelength which degrades the polymer and at which the photodegrading compound is activated. The concentration of non-photoreducible dye is preferably about 10ppm to about 2% since below about 10ppm not much effect is obtained and more than about 2% is usually unnecessary and wasteful. Examples of suitable non-photoreducible dyes include triphenylmethane-based dyes such as ($\alpha^1$p-aminophenyl) $\alpha^1$-4-imino-2,5-cyclohexadien-1-ylindene-1-2,4-xylidine (C.I. No. 42,510, "Rosaniline" or "fuchsine"), (4-(bis(p-(dimethylamino) phenyl) methylene) 2-5-cyclohexadien-1-ylidene) dimethyl ammonium chloride (C.I. No. 42,555, "Gentian Violet"), and bis(p-dimethylaminophenyl) phenylmethane chloride (C.I. No. 42,000 "Malachite Green"). Other examples include prophyrins such as the complex magnesium salt of 1,3,5,8-tetramethyl-4-ethyl-2-vinyl-9-oxo-10-carbomethoxy phorbin-7-propionic acid phytyl ester ("a chlorophyll"), the complex magnesium salt of 1,58 -trimethyl-4-ethyl-2-vinyl-3-formyl-0-oxo-10-carbomethoxy phorbin-7-propionic acid phytyl ester ("b chlorophyll"), diphenyl-bis-azo-α-naphtylamine 4-sulphonic acid (C.I. No. 22,120, "Congo Red"), 3-carboxy-5-hydroxyl-p-sulfophenyl 4-p-sulfophenyl azo pyrazole (C.I.No. 19,140, "Tartrazine"), and "Pinakyptal Green." The preferred non-photoreducible dye is α-chlorophyll as it has a controllable rate of degradation which may be similar to the absorption by green plants.

OTHER INGREDIENTS

The solution also preferably includes in accelerator to increase the rate at which the photodegrading compound degrades the polymer. Organic electron donors such as amines, ureas, and their derivatives function well as accelerators. Triethanolamine and allyl thiourea are preferred as they are strong accelerators and are water-soluble. Other suitable accelerators include glyoxal, the sodium salt of ethylene diamine tetraacetic acid, almost any water soluble amine such as triethanolamine, triethylamine, etc. The concentration of accelerator is preferably about 10 to about 500% by weight (of the dye) since less than about 10% is ineffective and more than about 500% is unnecessary.

The solution also preferably includes up to about 10% anti-freeze such as ethylene glycol, if it is to be used in cold climates. Also, up to about 1% of a bactericide such as acrolein is preferably included to prevent degradation of the polymer by bacteria, if the polymer is a cellulose ether or other type of biodegradable polymer.

METHOD OF USE

A solution is designed to be sensitive to a particular wavelength range. For example, a solution of a cellulose ether and eosin B will be sensitive to the entire light spectrum from about 3,500A to about 7,800A. The solution could be placed in a colored glass tube which would absorb wavelengths not of interest. Alternatively, a non-photoreducing dye such as chlorophyll can be added; chlorophyll absorbs light at all wavelengths except about 500 to about 600 mm (green) and therefore the composition would only be sensitive to these wavelengths. Another example of how the composition can be designed for a particular wavelength would be a composition of a cellulose polymer, a photoreducible dye such as methylene blue, and a non-photoreducible dye such as rhodamine B. Methylene blue absorbs from about 500 (green) to about 700 mm (red) and rhodamine B absorbs from about 500 to about 600 mm and transmits from about 600 to about 700 mm. Thus, the solution would be sensitive to red light.

In designing the solution, one should keep in mind the length of time and intensity of light that the meter is to be used to measure since the meter is most sensitive initially and loses sensitivity as time passes. Thus, if it is to be used only for a few days or in weak light, the solution would be made more sensitive than if it were to be used over a long period or in intense light. Also, the initial viscosity of the solution should be designed so that the time required for the bubble to traverse the distance marked on the tube, if that method is used to measure viscosity, is not too rapid to be precisely measured nor so slow as to require a long waiting period. An initial time of about 5 seconds to about 2 minutes is generally satisfactory. However, if tube is to be used for a long (i.e., 6 months) exposure, an initial time of about 5 minutes or more may be necessary.

Once the solution has been designed and prepared it must be calibrated. Calibration is conveniently performed by exposing samples of the solution to light of a known wavelength and intensity for various periods of time. The viscosity of the samples is then determined and the solution is adjusted, if necessary, for greater or lesser sensitivity. Sensitivity can be increased, for example, by adding an accelerator, increasing the concentration of photodegrading compound, decreasing the concentration of the polymer, increasing the molecular weight of the polymer, etc. Sensitivity can be reduced, for example, by filtering out some of the light which the polymer or photodegrading compound is sensitive to by using a non-photoreducible dye or colored glass, increasing the concentration of polymer, decreasing the concentration of photodegrading compound, etc. The composition is then recalibrated.

The measurement of the viscosity can be made by any of the well-known methods of determining viscosity such as timing the rise or fall of a floating or sinking ball. However, the preferred method is by timing the rise of a bubble or the rise or fall of a ball in the solution over a set distance. These methods are preferred because they require no special equipment, other than a stop watch, and can be done in the field by a person with no special skills.

To use the solution to measure the amount of light falling on an area over a period of time, the solution is enclosed in a suitable clear or colored container and deposited in the area. The same solution in another, but opaque, container is preferably deposited with the first container so that the effects of heat on the degradation of the solution can be allowed for. The allowance is made by subtracting the quantity of light which would be required to produce the decrease in the viscosity of the solution in the opaque container from the quantity of light required to produce the decrease in the viscosity of the solution in the other container.

The deposition of the containers can be made by hand or from the air. Since a large number could be used the destruction or theft of an occasional container would not be the problem that it is with more expensive light meters. Typical uses include determining the amount of light falling on an area in order to study the effects of smoke pollution or decide on crop plantings, etc.

The following examples further illustrate this invention. Examples II and IV are preferred as those solutions are in a good spectral region, they had a good reaction rate, and they had no side problems.

EXAMPLE I

The following composition was prepared by dissolving the cellulose in water at room temperature, filtering, then adding the eosin and TEA:

1.6% hydroxyethyl cellulose sold by Union Carbide as "Cellosize QP4400."
0.1% eosin B
1.0% triethanolamine (TEA) water (to 100%)

The composition was placed in a tube (similar to the drawing) up to the top mark, corked, and sealed with silicone resin. The composition was sensitive to the green and blue regions of the spectrum. The composition was irradiated with 3000ft. candles from incandescent and white fluorescent lamps at 25°C. The time required for the bubble to rise between the lines on the tube was initially 78 seconds. After 24 hours of irradiation, the bubble rise time was 16 seconds, and after 48 hours, it was 4 seconds.

EXAMPLE II

Using the procedure of Example I, the following composition was prepared and placed in a tube:

1.6% hydroxyethylcellulose sold by Union Carbide as "Cellosize QP4400"
0.005% a-chlorophyll
water (to 100%)

The composition was sensitive to green light and was irradiated with 5000 ft. candles from an iodine tungsten arc lamp at 25°C. The sample was 24 inches away from the lamp. The following table gives the results:

| Irradiation Time (hours) | Bubble Rise Time (seconds) |
|---|---|
| 0 | 78 |
| 24 | 45 |
| 48 | 34 |

EXAMPLE III

Using the procedure of Example I, the following composition was prepared and placed in a tube:

1.6% hydroxethylcellulose sold by Union Carbide as "Cellosize QP4400"
0.15% Congo Red
0.1% methylene blue 2B
1.0% triethanolamine
water (to 100%)

The composition was principally sensitive to red light. The composition was irradiated as in Example I. The following table gives the results.

| Irradiation Time (hours) | Bubble Rise Time (seconds) |
|---|---|
| 0 | 78 |
| 24 | 23 |
| 48 | 12 |

EXAMPLE IV

Using the procedure of Example I, the following composition was prepared, placed in a tube as in the drawing, and sealed:

1% hydroxypropyl methyl cellulose sold by Union Carbide as "Methocal 90HQ 50,000"
0.001% Eosin B
0.025% TEA
water (to 100%)

Initially, 23 seconds were required for the air bubble to move between the lines on the tube when it was inverted, a distance of about 3½ inches. The tube was placed in front of an incandescent light emitting 3,000 foot candles at 500 to 600 μm. After 30 hours the bubble required only 18 seconds to traverse the distance, after 60 hours it required 10 seconds, and after 120 hours only 4 seconds.

EXAMPLE V

Using the procedure of Example I, the following composition was prepared, placed in a tube as in the drawing, and sealed:

1% hydroxypropyl methyl cellulose sold by Union Carbide as "Methocel 90 HQ 50,000"
0.001% methylene blue
water (to 100%)

The light meter was tested as in the previous example. The following results were obtained:

| Irradiation Time (hours) | Bubble Rise Time (seconds) |
|---|---|
| 0 | 23 |
| 30 | 19 |
| 60 | 15 |
| 120 | 9 |

EXAMPLE VI

Using the procedure of Example I, the following composition was prepared, placed in a tube as in the drawing, and sealed:

3% hydroxypropylmethyl cellulose sold by Union Carbide as "Methocel 90HQ 50,000"
0.01% sodium nitrite
water (to 100%)

The light meter was tested as in Example IV. The following table gives the results:

| Irradiation Time (hours) | Bubble Rise Time (Minutes) |
|---|---|
| 0 | 23 |
| 30 | 21 |
| 60 | 17 |
| 120 | 10 |

Using light of the same wattage, but 300 to 600 μm, the following results were obtained.

| Irradiation Time (hours) | Bubble Rise Time |
|---|---|
| 240 | 5 minutes |
| 480 | 2.5 minutes |
| 960 | 65 seconds |

Additional examples may be found in our article titled "Photodepolymerization of Hydroxypropylmethylcellulose," *Journal of Applied Polymer Science*, Vol. 16, pp. 2449-2459 (1972), herein incorporated by reference.

We claim:

1. A chemical light meter comprising a sealed tube containing
   A. a composition which comprises:
      1. a solvent;
      2. about 0.1 to about 10% of a polymer having a molecular weight of at least 50,000 entirely dissolved in said solvent, which polymer degrades in the presence of light of a first wavelength; and
      3. about 10 ppm to about 2% of a photodegrading compound entirely dissolved in said solvent which degrades said polymer when exposed to light of a second wavelength; and B. means for measuring the viscosity of said composition.

2. A chemical light meter according to claim 1 wherein said means for measuring the viscosity of said composition is a bubble large enough to contact the entire perimeter of the tube when said tube is vertical and said bubble is in the middle of said tube, said composition filling at least one-half inch of said tube when said tube is vertical.

3. A chemical light meter according to claim 1 wherein said tube is marked with two lines at least two inches apart.

4. A chemical light meter according to claim 1 wherein said means for measuring the viscosity of said composition is a ball.

5. A chemical light meter according to claim 1 wherein said composition includes about 2% of a non-photoreducible dye which absorbs light of a third wavelength, is transparent at said first and second wavelengths, and is not appreciably photodegraded.

6. A chemical light meter according to claim 5 wherein said non-photoreducible dye is α-chlorophyll.

7. A chemical light meter according to claim 1 wherein said photodegrading compound is a photoreducible dye having an oxidation potential (when in a photoreduced state) of at least about −200 mv, and said polymer has a molecular weight of at least about 500,000.

8. A chemical light meter according to claim 7 wherein said photoreducible dye is a leuco dye and said polymer is a polyether.

9. A chemical light meter according to claim 8 wherein said leuco dye is a fluorescein dye and said polyether is a cellulose polyether.

10. A chemical light meter according to claim 9 wherein said cellulose polyether has the general formula

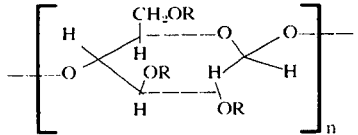

where n is an integer from about 300 to about 3000 and R is selected from the group consisting of H, alkyl to $C_4$, hydroxyalkyl to $C_4$, and mixtures thereof.

11. A chemical light meter according to claim 9 wherein said leuco dye is eosin B.

12. A chemical light meter according to claim 9 wherein said cellulose polyether is hydroxethyl cellulose.

13. A chemical light meter according to claim 1 wherein said solvent is water.

14. A chemical light meter according to claim 1 which includes about 10 to about 500% (based on said photodegrading compound) of an accelerator.

15. A chemical light meter according to claim 14 wherein said accelerator is selected from the group consisting of triethanolamine, allyl thiourea, and mixtures thereof.

16. A chemical light meter according to claim 1 which includes up to about 10% of an anti-freeze and up to about 1% of a bacteriocide.

17. A chemical light meter according to claim 1 wherein said photodegrading compound is sodium nitrite.

18. A chemical light meter according to claim 1 wherein said first and second wavelengths are identical.

19. A method of measuring the amount of light falling on an area over a period of time comprising:

A. placing in said area for said period of time a light meter which comprises a sealed tube containing
   1. a composition which comprises:
      a. a solvent;
      b. about 0.1 to about 10% of a polymer having a molecular weight of at least 50,000 entirely dissolved in said solvent, which polymer degrades in the presence of light of a first wavelength; and
      c. about 10 ppm to about 2% of a photodegrading compound entirely dissolved in said solvent which degrades said polymer when exposed to light of a second wavelength; and
   2. means for measuring the viscosity of said composition;

B. determining the viscosity of the composition in said light meter; and

C. comparing said viscosity to the viscosities of a set of identical compositions exposed to various known quantities of light of comparable wavelength.

20. A method according to claim 19 wherein said means for measuring the viscosity of said composition is a bubble large enough to contact the entire perimeter of the tube when said tube is vertical and said bubble is in the middle of said tube, said composition filling at least one-half inch of said tube when said tube is vertical.

21. A method according to claim 19 wherein said means for measuring the viscosity of said composition is a ball.

22. A method according to claim 19 wherein said composition includes about 10 ppm to about 2% of a non-photoreducible dye which absorbs light of a third wavelength, is transparent at said first and second wavelengths, and is not appreciably photodegraded.

23. A method according to claim 19 wherein said photodegrading compound is a photoreducible dye having an oxidation potential (when in a photoreduced state) of at least about −200mv, and said polymer has a molecular weight of at least about 500,000.

24. A method according to claim 23 wherein said leuco dye is a fluorescein dye and said polyether is a cellulose polyether.

* * * * *